United States Patent
Shivaji-Rao

(10) Patent No.: US 7,992,086 B2
(45) Date of Patent: Aug. 2, 2011

(54) SYSTEM AND METHOD FOR ADJUSTING A MEDIA-PLAYING SET

(75) Inventor: Vishnu Kumar Shivaji-Rao, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 465 days.

(21) Appl. No.: 11/479,071

(22) Filed: Jun. 30, 2006

(65) Prior Publication Data

US 2008/0005696 A1   Jan. 3, 2008

(51) Int. Cl.
*G06F 3/00* (2006.01)

(52) U.S. Cl. ......... 715/716; 715/822; 348/673; 348/687

(58) Field of Classification Search ............... 715/716, 715/822; 725/138; 348/184, 185, 673, 687
See application file for complete search history.

(56) References Cited

U.S. PATENT DOCUMENTS

| | | |
|---|---|---|
| 4,264,925 A | 4/1981 | Freeman et al. |
| 4,967,337 A | 10/1990 | English et al. |
| 5,220,496 A | 6/1993 | Tanaka et al. |
| 5,235,414 A | 8/1993 | Cohen |
| 5,278,565 A | 1/1994 | Horn |
| 5,353,238 A | 10/1994 | Neef et al. |
| 5,488,427 A | 1/1996 | Kayashima et al. |
| 5,504,896 A | 4/1996 | Schell et al. |
| 5,534,911 A | 7/1996 | Levitan |
| 5,671,011 A * | 9/1997 | Kim .............................. 348/189 |
| 5,754,940 A | 5/1998 | Smith et al. |
| 5,799,311 A | 8/1998 | Agrawal et al. |
| 5,815,662 A | 9/1998 | Ong |
| 5,850,340 A | 12/1998 | York |
| 5,936,611 A | 8/1999 | Yoshida |
| 5,956,487 A | 9/1999 | Venkatraman et al. |
| 5,982,445 A * | 11/1999 | Eyer et al. ...................... 348/461 |
| 6,005,597 A | 12/1999 | Barrett et al. |
| 6,006,265 A | 12/1999 | Rangan et al. |
| 6,008,836 A * | 12/1999 | Bruck et al. ................... 725/131 |
| 6,166,778 A | 12/2000 | Yamamoto et al. |
| 6,195,616 B1 | 2/2001 | Reed et al. |
| 6,202,210 B1 | 3/2001 | Ludtke |
| 6,233,611 B1 | 5/2001 | Ludtke et al. |

(Continued)

FOREIGN PATENT DOCUMENTS

EP   0 844 788   5/1998

(Continued)

*Primary Examiner* — Weilun Lo
*Assistant Examiner* — Phenuel S Salomon
(74) *Attorney, Agent, or Firm* — Chernoff, Vilhauer, McClung & Stenzel

(57) ABSTRACT

A system and method enabling comparative and interactive preview of the effects of different operational settings to facilitate adjustment of a media-playing set includes providing a memory to store a test sample for each control item and a demonstrational tool to generate a plurality of preview items for simultaneous presentation on the display while the settings of the control item are being adjusted, such preview items being based on the test sample such that each preview item reflects the effect on the sample caused by selection of a respective setting for the control item. A system and method enabling expanded interactive preview of the effects of operational settings similar to the above except the test sample is provided for grouped pairs of the control items and each preview item reflects the effect caused by selection of different combinations of settings for the control items in this grouped pair.

32 Claims, 10 Drawing Sheets

U.S. PATENT DOCUMENTS

| | | | |
|---|---|---|---|
| 6,278,433 B2 * | 8/2001 | Narui | 345/581 |
| 6,343,261 B1 | 1/2002 | Iwanowski et al. | |
| 6,351,561 B1 | 2/2002 | Iyengar | |
| 6,377,858 B1 | 4/2002 | Koeppe | |
| 6,393,373 B1 | 5/2002 | Duyar et al. | |
| 6,425,128 B1 | 7/2002 | Krapf et al. | |
| 6,430,526 B1 | 8/2002 | Toll | |
| 6,438,752 B1 | 8/2002 | McClard | |
| 6,504,950 B1 * | 1/2003 | Murashita et al. | 382/162 |
| 6,505,243 B1 | 1/2003 | Lortz | |
| 6,507,762 B1 | 1/2003 | Amro et al. | |
| 6,542,163 B2 | 4/2003 | Gorbet et al. | |
| 6,556,960 B1 | 4/2003 | Bishop et al. | |
| 6,581,109 B1 * | 6/2003 | Fields et al. | 709/246 |
| 6,614,987 B1 | 9/2003 | Ismail et al. | |
| 6,633,235 B1 | 10/2003 | Hsu et al. | |
| 6,725,102 B2 | 4/2004 | Sun | |
| 6,727,914 B1 | 4/2004 | Gutta | |
| 6,747,688 B1 * | 6/2004 | Kang | 348/182 |
| 6,756,997 B1 | 6/2004 | Ward, III et al. | |
| 6,766,283 B1 | 7/2004 | Goldman et al. | |
| 6,772,096 B2 | 8/2004 | Murakami et al. | |
| 6,782,495 B2 | 8/2004 | Bernklau-Halvor | |
| 6,789,081 B1 | 9/2004 | Vanska | |
| 6,791,624 B1 * | 9/2004 | Suga | 348/588 |
| 6,795,011 B1 | 9/2004 | Berthoud et al. | |
| 6,813,775 B1 | 11/2004 | Finseth et al. | |
| 6,819,364 B2 | 11/2004 | Creed | |
| 6,842,776 B1 | 1/2005 | Poisner | |
| 6,851,090 B1 | 2/2005 | Gutta et al. | |
| 6,868,292 B2 | 3/2005 | Ficco et al. | |
| 6,879,350 B2 | 4/2005 | Kwon et al. | |
| 6,879,973 B2 | 4/2005 | Skaanning et al. | |
| 6,895,113 B2 * | 5/2005 | Baker et al. | 382/167 |
| 6,907,545 B2 | 6/2005 | Ramadei et al. | |
| 6,915,308 B1 | 7/2005 | Evans et al. | |
| 6,917,819 B2 | 7/2005 | Collins | |
| 6,922,482 B1 | 7/2005 | Ben-Porath | |
| 6,922,680 B2 | 7/2005 | Buczak | |
| 6,934,713 B2 | 8/2005 | Schawartz et al. | |
| 6,947,156 B1 | 9/2005 | Jeyachandran et al. | |
| 6,947,935 B1 | 9/2005 | Horvitz et al. | |
| 6,947,966 B1 | 9/2005 | Oko, Jr. et al. | |
| 6,951,031 B2 | 9/2005 | Hatano | |
| 6,954,678 B1 | 10/2005 | Phan et al. | |
| 6,954,689 B2 | 10/2005 | Hanson et al. | |
| 6,957,202 B2 | 10/2005 | Skaanning et al. | |
| 7,092,008 B1 * | 8/2006 | Bernard et al. | 348/180 |
| 7,113,181 B2 * | 9/2006 | Tey et al. | 345/204 |
| 7,215,343 B2 * | 5/2007 | Edge | 345/604 |
| 7,268,829 B2 * | 9/2007 | Kim | 348/564 |
| 7,574,653 B2 * | 8/2009 | Croney et al. | 715/249 |
| 2002/0003903 A1 | 1/2002 | Engeldrum et al. | |
| 2002/0010589 A1 | 1/2002 | Nashida et al. | |
| 2002/0116539 A1 | 8/2002 | Bryczkowski et al. | |
| 2002/0140728 A1 | 10/2002 | Zimmerman | |
| 2003/0046303 A1 | 3/2003 | Chen et al. | |
| 2003/0061212 A1 | 3/2003 | Smith et al. | |
| 2003/0084448 A1 | 5/2003 | Soundararajan | |
| 2003/0084449 A1 | 5/2003 | Chane et al. | |
| 2003/0110412 A1 | 6/2003 | Neville | |
| 2003/0110413 A1 | 6/2003 | Bernklau-Halvor | |
| 2003/0111754 A1 | 6/2003 | Hinzpeter et al. | |
| 2004/0051816 A1 | 3/2004 | Ikeguchi | |
| 2004/0070628 A1 | 4/2004 | Iten et al. | |
| 2004/0078809 A1 | 4/2004 | Drazin | |
| 2004/0143403 A1 | 7/2004 | Brandon et al. | |
| 2004/0145371 A1 | 7/2004 | Bertness et al. | |
| 2004/0153773 A1 | 8/2004 | Woo et al. | |
| 2004/0176966 A1 | 9/2004 | Chen | |
| 2004/0187168 A1 | 9/2004 | Shintani et al. | |
| 2004/0207764 A1 | 10/2004 | Naoi et al. | |
| 2004/0243940 A1 * | 12/2004 | Lee et al. | 715/744 |
| 2005/0066241 A1 | 3/2005 | Gross et al. | |
| 2005/0081410 A1 | 4/2005 | Furem et al. | |
| 2005/0085973 A1 | 4/2005 | Furem et al. | |
| 2005/0097070 A1 | 5/2005 | Enis et al. | |
| 2005/0097507 A1 | 5/2005 | White et al. | |
| 2005/0141542 A1 | 6/2005 | Handekyn et al. | |
| 2005/0149980 A1 | 7/2005 | Yun | |
| 2005/0159922 A1 | 7/2005 | Hsiung et al. | |
| 2005/0159996 A1 | 7/2005 | Lazarus et al. | |
| 2005/0235319 A1 | 10/2005 | Carpenter et al. | |
| 2006/0031400 A1 | 2/2006 | Yun et al. | |
| 2006/0212479 A1 * | 9/2006 | Habas et al. | 707/104.1 |
| 2008/0130992 A1 * | 6/2008 | Fujii | 382/167 |

FOREIGN PATENT DOCUMENTS

| | | |
|---|---|---|
| EP | 1 176 503 | 1/2002 |
| EP | 0 798 921 | 12/2004 |
| EP | 1 517 259 | 3/2005 |
| GB | 2 354 902 | 4/2001 |
| WO | WO 01/33858 | 5/2001 |
| WO | WO 03/044684 | 5/2003 |
| WO | WO 2004/044789 | 5/2004 |
| WO | WO 2004/057473 | 7/2004 |
| WO | WO 2004/095456 | 11/2004 |

* cited by examiner

SYSTEM AND METHOD FOR ADJUSTING A MEDIA-PLAYING SET

CROSS-REFERENCE TO RELATED APPLICATIONS

Not applicable.

BACKGROUND OF THE INVENTION

The present invention relates to a system and method for adjusting a media-playing set and relates, in particular, to a system and method facilitating adjustment of the operational characteristics of the set.

The advancement of technology has made it possible to provide more features in media-playing sets at lower cost than previously. At one time, media-playing sets, such as televisions, had a limited number of controls including, for example, an on-off button, a volume control, and a channel selector, and were equipped to receive a handful of local broadcast channels. Modern systems, on the other hand, are typically designed to receive input signals from a variety of input sources, and the number of channels received can approach or exceed one hundred. These can include not only traditional air broadcast channels but also satellite and cable broadcasts. In addition, the set may process signals from directly connected peripherals such as computers, videocassette recorders, digital video disc recorders, compact disc players, stereos, and so on. Hybrid forms have increasingly appeared including televisions able to process digitized signals, such as in MPEG-2 or -4 format, and computers or miniplayers able to process television or other media broadcasts via a tuner card or through upstream conversion to digitized format.

In this environment, where media formats, sources, and types are found in ever expanding variety, it has become increasingly important to provide controls that enable the user to effectively adjust the operational characteristics of the set so that the picture and sound, for example, are optimized for the particular type of input received. Typically this task is performed by enabling the user to bring up an on-screen control item, say the brightness control, by navigating through a control menu with keyboard and mouse or, for example, with the navigational buttons of a handheld remote control. After selecting the control for adjustment, normally the user is presented with choice between various settings, for example, the user may be able to move a slider bar rightward to select a higher setting or leftward to select a lower. Once the user has made the choice, the new setting then takes effect so that the broadcast program or other media type being played on the set conforms to this new setting. If the user is unhappy with the new setting, the user can repeat the procedure and select a different setting.

The difficulty with the adjustment procedure just described is that the user is often uncertain as to the potential effect of changing the setting. Rather than tediously trying each setting until the optimal setting is found, the user is likely to make one or two attempts to improve the setting before giving up, perhaps resigning himself or herself to a new setting that provides even worse reception than before. The likelihood of this can be appreciated by recognizing that in changing one setting, an adverse effect can result for a different setting. Some users, uncertain of what the overall effect will be from changing a particular setting, may conclude it is best to leave all the settings alone. This, in turn, can lead to the set being blamed for inferior quality of manufacture when, in fact, the poor reception experienced by the user and possibly his or her acquaintances is merely the result of the settings being off.

In accordance with the foregoing, a principal object of the present invention to provide a system and method that enable the user to more effectively adjust the operational characteristics of a media-playing set. In particular, it is desired in such system and method that the user not be deterred from adjusting the operational settings by the perceived tediousness of the procedure or the risk of further reducing the reception quality.

BRIEF SUMMARY OF THE INVENTION

In accordance with a first aspect of the present invention, a system for adjusting the operation of a media-playing set is provided comprising a display and a control item viewable on the display, this control item being adjustable between different settings for adjusting the operational characteristics of the set; memory to store a test sample for the control item; and a demonstrational tool to generate a plurality of preview items for simultaneous presentation on the display during adjustment of the control item, such preview items being based on the test sample such that each preview item reflects the effect on the test sample caused by selection of a respective setting for the control item. Under such a system, to the extent that the preview items are simultaneously displayed so as to show the effects of different settings on a particular test sample, the user is not left to guess as to what the effect will be of choosing a particular setting. Moreover, the user can directly compare the different effects that are simultaneously presented thereby sparing himself or herself the trouble of first picking one setting and then another and then, in a close case, perhaps going back and forth in the often unproductive hope of precisely comparing the imperfect mental impression of one with the present reality of the other.

In accordance with a second aspect of the present invention, a method is provided for adjusting the operation of a media-playing set comprising the steps of providing a display and a control item viewable on the display, the control item being adjustable between different settings for adjusting the operational characteristics of the set; providing a test sample for the control item; and while adjusting the respective settings of the control item, reviewing a plurality of preview items simultaneously presented on the display, such preview items being based on the test sample such that each preview item reflects the effect on the test sample caused by selection of a respective setting for the control item. To the extent that the settings are represented by a corresponding preview item, this method ensures that the user is able to directly compare the respective effects of the different settings in preview form. In particular, any ambiguity over which setting is more desirable can be immediately resolved by the user consistent with the user's own subjective criteria.

In accordance with a third aspect of the present invention, a system for adjusting the operation of a media-playing set is provided comprising a display and control items viewable on the display, each control item being adjustable between different settings for adjusting a corresponding operational characteristic of the set; memory to store a test sample for a grouped pair of the control items; and a demonstrational tool to generate a plurality of preview items for simultaneous presentation on the display during adjustment of the control item, the preview items being based on the test sample such that each preview item reflects the effect on the test sample caused by selection of different combinations of settings for the control items in the grouped pair. This system enables the user to preview the effects of different settings for a pair of control items simultaneously, that is, with this system, the user is able to eliminate uncertainty over the effect that adjusting one control item will have on another control item.

In accordance with a fourth aspect of the present invention, a method is provided for adjusting the operation of a media-playing set comprising providing a display and control items viewable on the display, each control item being adjustable between different settings for adjusting a corresponding operational characteristic of the set; providing a test sample for a grouped pair of the control items; and while adjusting at least one of the control items of the grouped pair, reviewing a plurality of preview items simultaneously presented on the display, the preview items being based on the test sample such that each preview item reflects the effect on the test sample caused by selection of different combinations of settings for the control items in the grouped pair. This method allows the user to assess the effect of different settings for a grouped pair of control items simultaneously so that, for example, the user can select the best combination of settings for the pair which, although possibly not equivalent to the setting that would be chosen were each control item to be adjusted individually, provides the best setting for the grouped pair when the pair are considered together.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

I. General System Architecture

Figure 1:
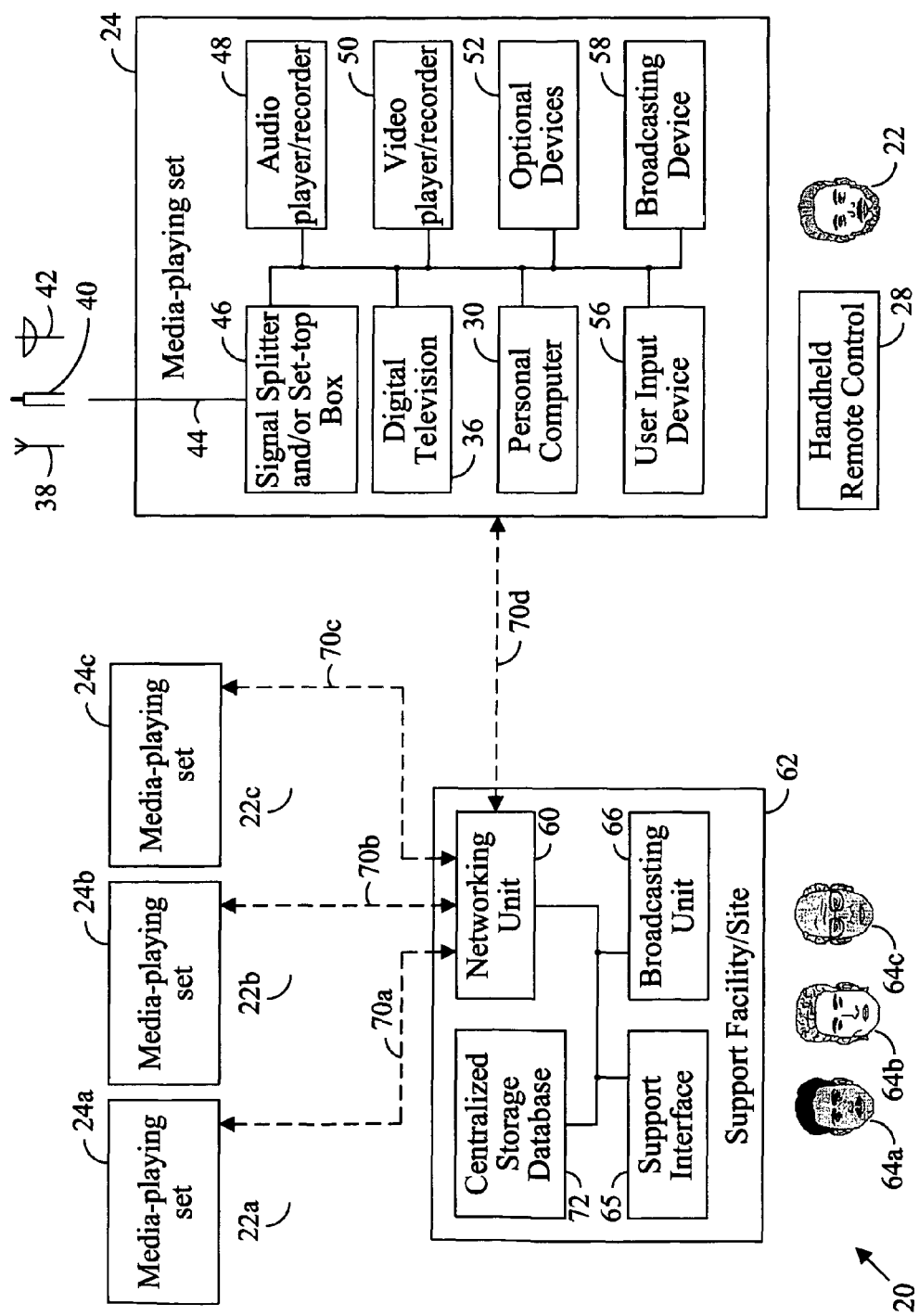
FIG. 1 is a diagrammatic view of an exemplary system for adjusting a media-playing set constructed in accordance with the present invention.
Figure 2:
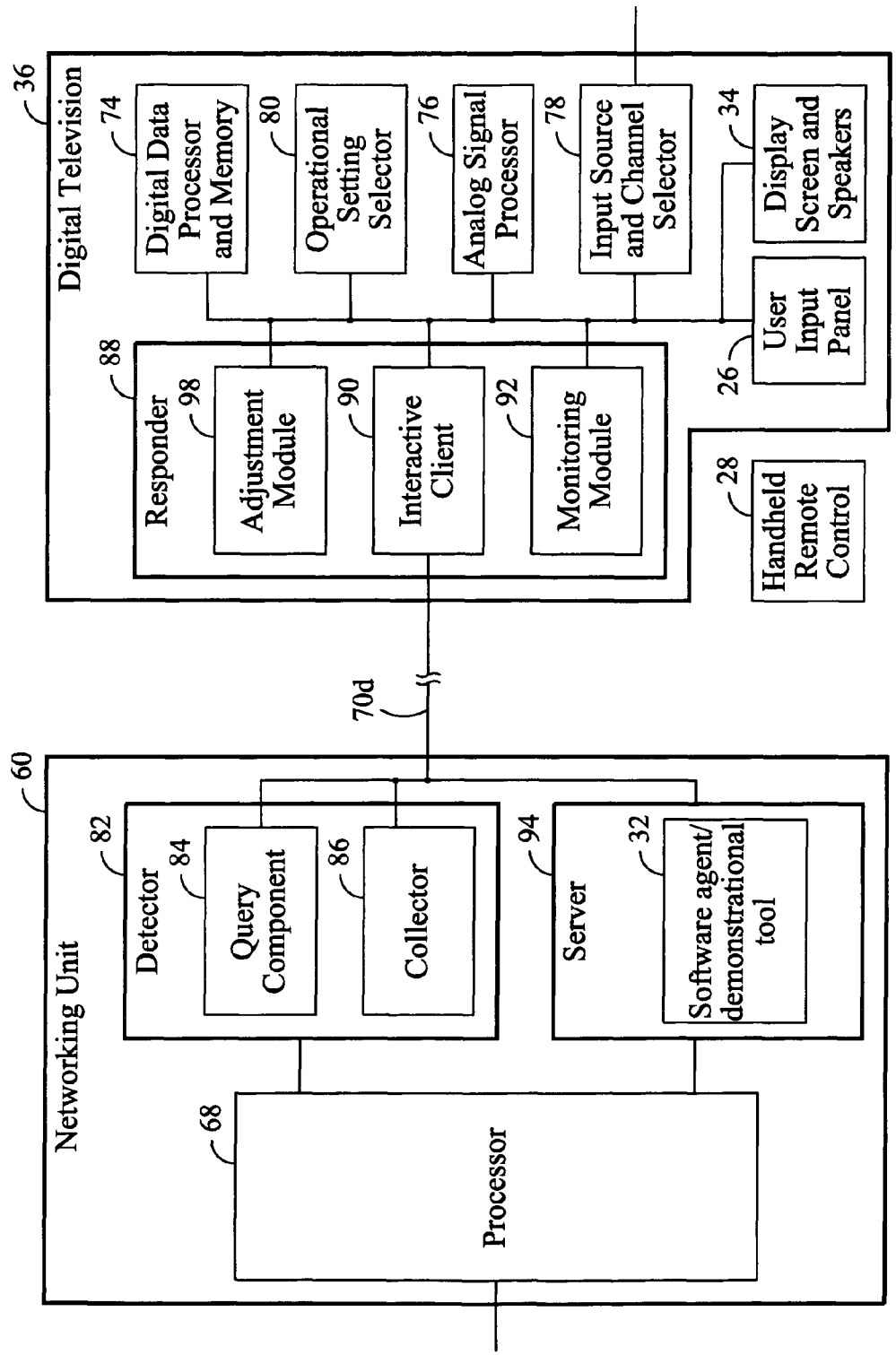
FIG. 2 is a schematic view showing details of the system of FIG. 1.

FIG. 1 shows, in functional block-diagram form, an exemplary system 20 constructed in accordance with the present invention for helping an end user 22 adjust a media-playing set 24. Referring also to FIG. 2, the user is able to adjust various operational settings for the set, such as picture and sound settings, using one or more control devices, which can include an input panel 26 on the console of the set, a handheld remote control 28, or the mouse and keyboard devices of a personal computer 30. Such operational settings are herein referred to as control items; hence, the "brightness" of the set, for example, is regarded as a control item. A significant feature of the system is a demonstrational tool 32 having the capability of generating a plurality of preview items for simultaneous presentation on the output device that includes display screen 34 of the set. Each preview item reflects the effect on a test sample caused by selection of a respective setting for the control item. This enables the user to directly compare the effects of different settings for the control item and thus facilitates user adjustment of the control item. This feature will be further described below under separate Roman numeral headings II and III.

In the exemplary embodiment depicted in FIG. 1, the media-playing set 24 is a full-featured consumer entertainment system including a number of separately purchasable components and designed to receive signals from a variety of different sources. The heart of the set depicted is a digital television 36 which receives external signals from an air antenna 38, cable link 40, or satellite link 42 through an external feed 44 by way of a signal splitter and/or set-top box 46 so that multiple signals are fed into the television. The television also receives input signals from various connected peripherals including, for example, from a compact disc (CD) or other audio player 48, from a combined video cassette recorder (VCR) and digital video disc (DVD) player or other video player 50, and from a game console, camcorder, digital videorecorder home system or other optional device 52. A digital video interface (DVI) input/control signal is supplied from the personal computer 30. The user input device 56 includes the user input panel 26 on the television's console, the mouse and keyboard of the computer, and may include an RS-232C connection. The broadcasting device 58 includes the television's display screen and speakers 34 and any other output devices such as standalone quad speakers. The benefits of the present invention are most fully realized in the context of a full-featured media-playing set of the type described insofar as proper adjustment of the set becomes more important as the variety of signal sources and types increases; however, the term "media-playing set," as used herein and in the claims, is also intended to encompass less elaborate, unitary systems such as personal digital assistants (PDA's) having media access through a network.

Referring to FIGS. 1 and 2 together, in the exemplary system 20 depicted, the demonstrational tool 32 is located off-site. It is shown as being part of a networking unit 60 included at a support facility or site 62. This site may, for example, be a call-in center staffed, for example, by customer service representatives 64*a*, *b*, and *c* who are trained to answer user inquiries and who direct operations at the site with the aid of a support interface 65, such as computer terminals, and a broadcasting unit 66, such as display screens and speakers replicating the images and sounds currently exhibited at the user's set. Alternatively, the operations of the support site can be designed to substantially run automatically as facilitated by the processor 68 provided in the networking unit. In any event, the support facility preferably provides a centralized site for remotely monitoring and controlling the operation of the media-playing set 24 of the indicated user as well as the respective sets 24*a*, *b*, and *c* of other users 22*a*, *b*, and *c*. These functions can be performed over temporary network connections, indicated in dashed-line view as items 70a, b, c, and d, such as by dialup connection over conventional phone lines. Preferably a secure connection is used to prevent eavesdropping, such as by use of Secure Sockets Layer (SSL) technology, and a modern communications language is employed that is readily readable by the set using a conventional web browsing application, such as Extensible Markup Language (XML).

As noted above, the demonstrational tool 32 is situated at the support site 62 located remotely from but selectively connectible electronically to each set. The term "remotely" in this context, as used herein and in the claims, is intended to denote that the site is not physically accessible to any user in the home or quarters where the set is located. The demonstrational tool 32 generates preview images that facilitate selection of a respective setting for a desired control item. By locating this tool off-site, the superior processing power of the remote site is available to assist in generating these images, the tool can be adapted for many different models of sets without requiring that multiple local versions of the tool be manufactured, and, if the features of any sets are updated remotely, the tool can be readily updated without increasing the size of the update routine to be run locally at each set. Similarly, the vast memory provided by a centralized storage database 72 at the remote site allows the test samples on which the preview items are based to be conveniently stored even if multiple versions of samples are needed because of many different models of sets and without tying up the relatively limited memory 74 typically provided in each set even where the test samples are memory intensive objects, such as video clips.

FIG. 2 depicts certain functional components of the digital television 36 and the remote networking unit 60 as selectively connected together via temporary network connection 70d. This connection is established, for example, by dial-up request to the networking unit from computer 30 (FIG. 1) and through the digital video interface (DVI) control/signal line connecting the computer to the digital television. The digital television conventionally includes a digital data processor and memory 74 to demodulate, decode, and process the digital signal input, an analog signal processor 76 for demodulating and processing the analog signal input, an input source and channel selector 78 for selecting between input sources and channels, and an operational setting selector 80 for adjusting and maintaining the operational settings of the set, such as relate to picture and sound characteristics.

The general function of the remote networking unit 60 is to remotely detect the status of each set and to interactively control the set's operation. It includes, for example, a detector 82 having a query component 84 that continually polls or submits query requests to the set and a collector 86 for receiving the resulting status information. These requests are handled at the set by a responder 88 where they are received by an interactive client 90 and relayed to a monitoring module 92 that monitors the current state of the source/channel and operational selectors, 78 and 80. The requested information is sent back to the interactive client for transmission to the remote collector. The query component could, alternatively, reside on the set so that collection of status information is initiated locally or such collection could be event-driven rather than continual. In any case, the current settings of the set together with any subsequent changes, such as the user starting the process of adjusting the set's operational settings, are preferably detected automatically by the networking unit.

In response to the user starting adjustment of an operational setting, such as by navigating from an on-screen menu to an operational control item and selecting it, the networking unit remotely responds with information to assist the user in making the adjustment. Referring to FIGS. 1 and 2 together, a test sample or image appropriate to the type of control item selected and to the model of set being used is retrieved from the centralized storage database 72 by the processor 68 and conveyed to a server 94. Here a software agent including a demonstrational tool 32 generates a plurality of preview items or images which are then received by the interactive client 90 of the set. Further processing of the preview items or images may be performed by the interactive client or, in an alternative embodiment, generation of the preview items may be done entirely locally by a demonstrational tool included in each set so as to dispense with the need for remote support; however, as indicated above, it is preferable to locate at least some of the processing performed by the demonstrational tool off-site for reasons of flexibility, upgradeability, cost economy, and efficient allocation of memory. From the interactive client, the plurality of preview items are sent to the adjustment module 98 which directs the digital data processor and memory 74 to render the items or images for simultaneous spaced apart presentation on the display screen 34.

It will be noted that in the exemplary system 20 depicted, the preview items are also displayed on the broadcasting unit 66, which replicates the images and sounds of the set's broadcasting device 58, so that a remote service representative 64a, b, or c, helping the user desirably has access to the same tools that are available to the user to facilitate adjustment of the set. The networking unit, by operations similar to those already described, enables the representative, where desired, to temporarily assume control over operation of the set so as to provide yet another level of assistance for the user. It will further be noted, in connection with FIGS. 1 and 2, that the functional components shown are so depicted for ease of illustration and description and that these components can be combined or divided differently than shown without substantially departing from at least the broader aspects of the present invention.

II. Comparative and Interactive Preview of Effects of Different Operational Settings FIG. 3 outlines a first exemplary method 100 for adjusting a media-playing set. The first step 102 of this method includes providing a display 34 (FIG. 2) with a control item viewable on the display and adjustable between different settings for adjusting the operational characteristics of the set. One such display format is shown in FIG. 4 which shows a conventional (prior art) on-screen control menu 104 that provides a number of control items, such as 106a, b, c, d, e, f, g, and h, each accessible from a pull down category, such as picture 108 or audio 110, for adjusting an operational characteristic of the set. The user can navigate between and select different ones of the control items using, for example, the menu and navigational buttons of the handheld remote 28 or the keyboard and mouse of the personal computer 30. This format has the advantage of bringing together a number of control items under related groupings; however, in an alternative menuless format, each control item can be selected and displayed individually such as by a corresponding button designated on the handheld remote.

Figure 4:
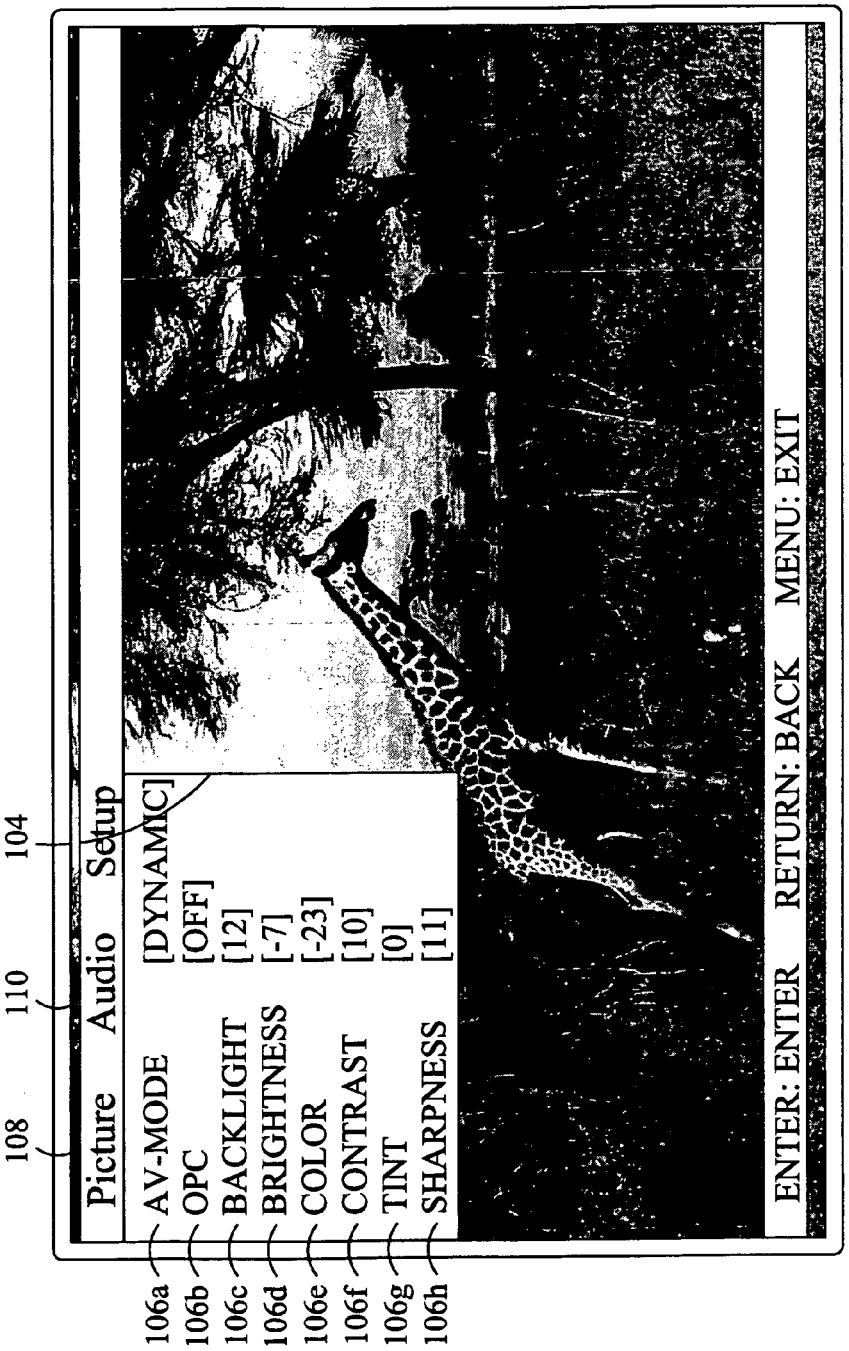
FIG. 4 is a plan view showing details of an on-screen control menu of conventional or prior art design.
Figure 5:
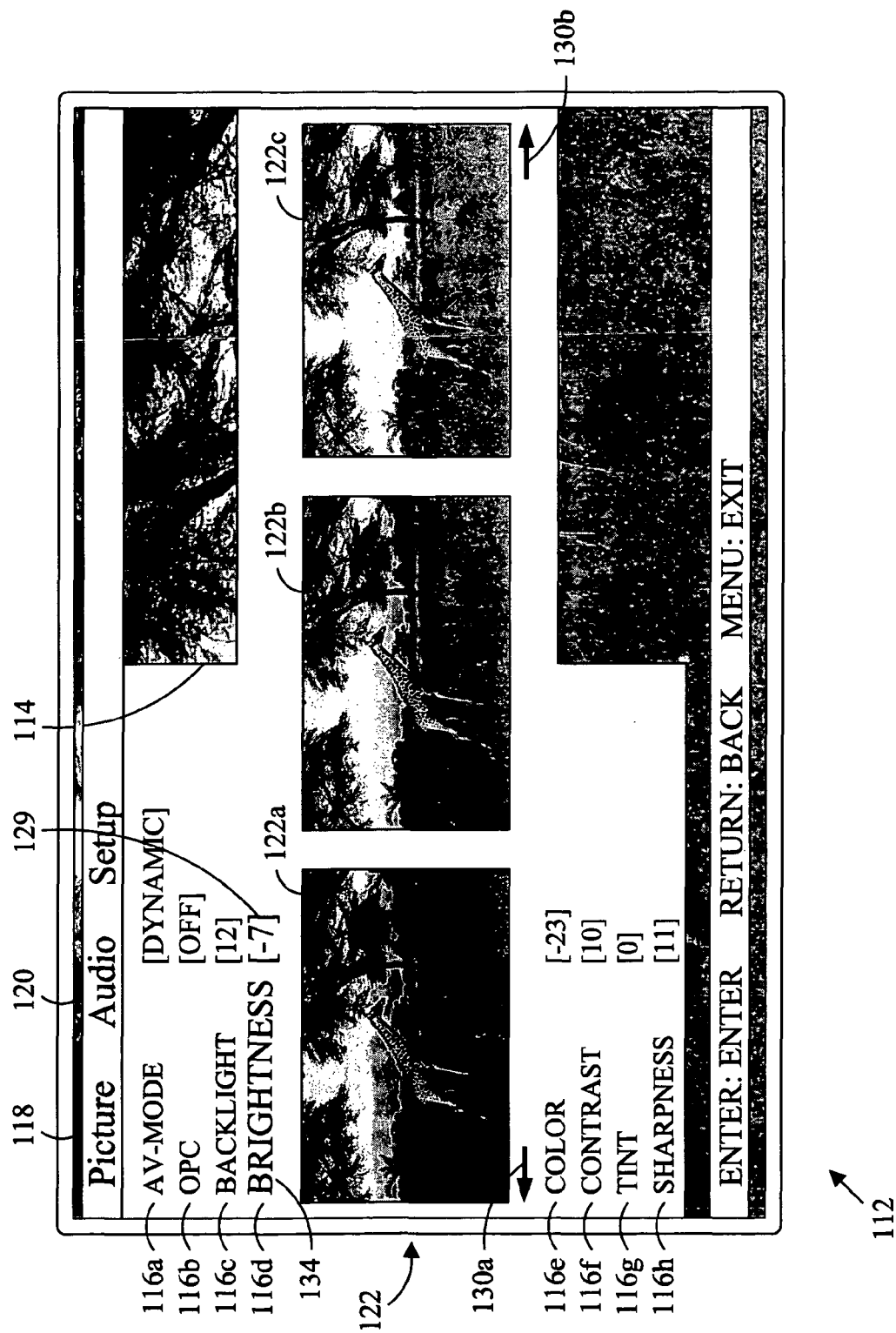
FIG. 5 is a plan view showing preview items for the brightness control item as simultaneously displayed on a media-playing set in accordance with a first exemplary method and system of the present invention.

Comparing FIG. 4 to FIG. 5, which shows an exemplary display 112 provided in accordance with a first system and method of the present invention, it will be noted that such display incorporates, with certain modifications, elements of a conventional on-screen control menu 114, including a comparable listing of control items, e.g., 116a, b, c, d, e, f, g, and h, accessible from pull-down categories for picture 118 and audio 120, so that the user is presented with an adjustment interface that is comfortably familiar in its general aspects and operation. Significantly, the exemplary display also provides a plurality or series of preview items 122 so that the user can preview the effects of selecting different settings for a particular control item, here the brightness item 116d. In the exemplary display shown, these preview items are simultaneously presented in overlapped relationship with the control menu. Furthermore, while the user is reviewing the preview items, the control menu is kept on the display. By tightly integrating the preview items with the control menu in this fashion, the user is reminded at all times of which control item is currently under adjustment while at the same time kept apprised of which related operational features are also available for adjustment.

Figure 3:
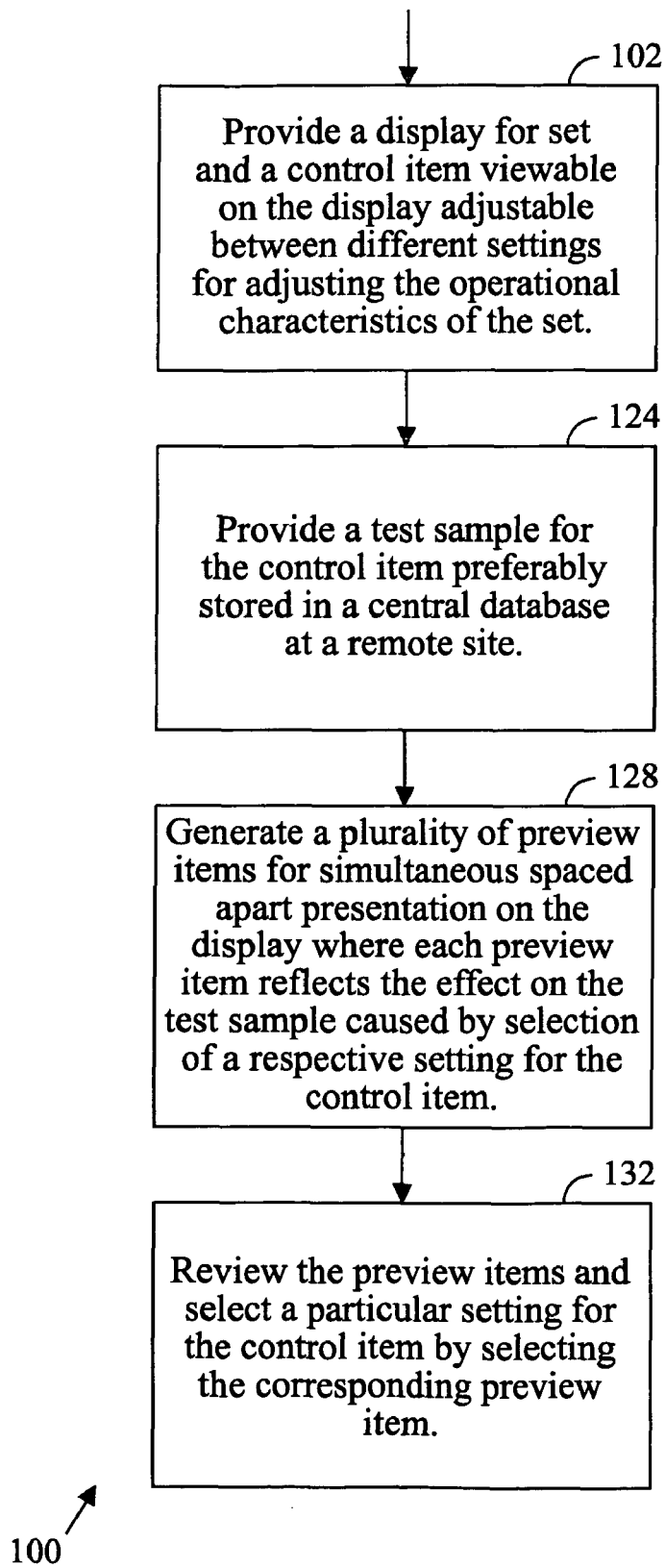
FIG. 3 is a flowchart outlining a first exemplary method for adjusting the operation of a media-playing set.
Figure 6:
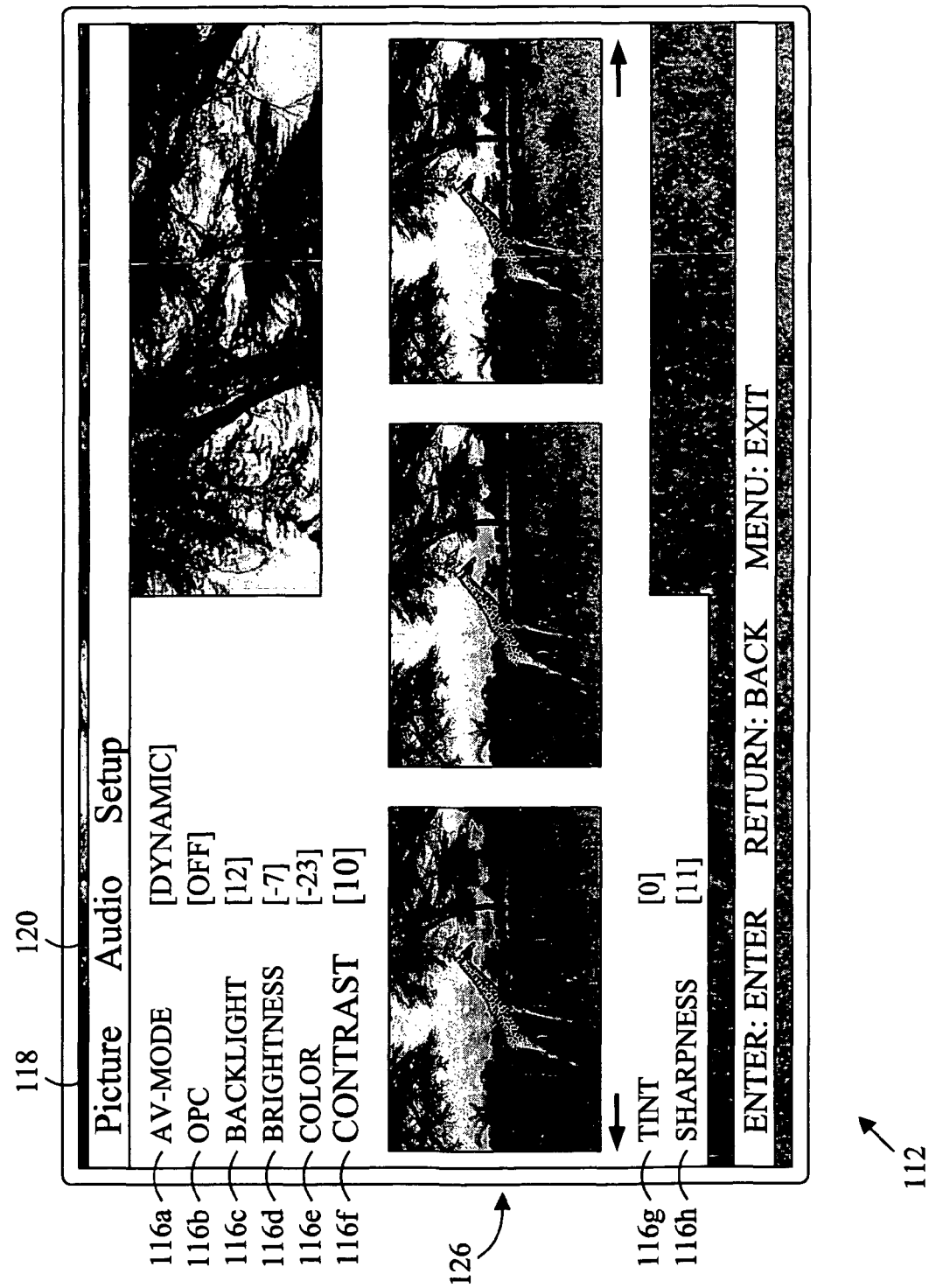
FIG. 6 is a plan view showing preview items for the contrast control item as simultaneously displayed on a media-playing set in accordance with a first exemplary method and system of the present invention.

Referring to step 124 of FIG. 3, in order that the preview items 122 for each control item will bear direct comparison, they are based on a common test sample. For the reasons discussed under Roman numeral heading I above, the respective test samples for the various control items and for the different models of sets are preferably stored in the centralized storage database 72 at the remote support site 62. Furthermore, each test sample is preferably specified so as to generally increase or accentuate the relative differences between the preview items based thereon. Thus, the preview items 122 in FIG. 5, which are provided to facilitate adjustment of the brightness control item 116d, are based on a common test image portraying darkly shaded ground cover, lightly shaded whitewashed buildings, and miscellaneous objects of various shades in between, so that the user can perceive the effect of various brightness selections on images potentially covering the full range of shades. Referring to FIG. 6, where the preview items 126 are provided to facilitate adjustment of the contrast control item 116f, the richly shaded landscape and building test image is again used so that the user can choose whichever selection provides the best contrast between the fine gradations of shading possible. Were, however, the preview items intended for adjustment of sharpness, an appropriate test sample would include, for example, black and white text of differing sizes with no distraction from objects of intermediate shading so that the user could more easily determine that setting where smudginess or blurriness of the text edges is minimized. Similarly, if an audio control item were being adjusted, such as bass level, an audio test sample incorporating a variety of voices or tones predominantly from the subject portion of the audio spectrum would be preferred.

Referring to step 128 of FIG. 3, this step involves generating a plurality of preview items for simultaneous presentation on the display where each preview item reflects the effect on the test sample caused by selection of a respective setting for the desired control item. As discussed under Roman numeral heading I above, these preview items can be generated on-site or, preferably, off-site as by a demonstrational tool 32 included at a remote support site 62. As shown in FIG. 5, these preview items are preferably arranged for spaced apart presentation, whether arranged vertically, horizontally, or in a cluster, so that the user can determine and preferably compare, at a glance, the different setting options. These preview items may also be presented in a variety of media formats, including still images, video clips, or audio clips, depending on the control item being adjusted, for example, a series of still images is suitable for adjusting brightness, sports video clips that concurrently feature a small ball in motion could be used for adjusting sharpness, and a series of audio clips arrayed for successive quick play is suitable for adjusting the bass level. It will be noted, however, that the benefits of the present invention are most fully realized in the context of adjusting picture characteristics where the user can perceive the preview items simultaneously presented both collectively as a catalog of options and individually so that the differences between them are immediately apparent. Thus in FIG. 5, for example, the user is able to perceive the preview items 122 not only all together at once as portraying a catalog of possible settings but also individually so that their relative differences are apparent, that is, there is a readily apparent difference between individual preview items 122a and 122b, between items 122b and 122c, and between items 122a and 122c. This, in turn, enables the user to immediately determine which corresponding setting is most appropriate.

As shown in FIG. 5, the generated preview items 122 include a current setting preview item 122b, an increment-by-one preview item 122c, and a decrement-by-one preview item 122a. These reflect, respectively, the effect on the test sample caused by selection of the current setting (here a brightness level of "−7"), of the current setting incremented by one (e.g., to level −6), and of the current setting decremented by one (e.g., to level −8). By presenting the preview items in a series of such limited number, the space occupied by the preview items on the display is minimized so that, for example, the preview items can be integrated with a familiar control menu. At the same time, sufficient information is conveyed to enable the user to immediately decide whether further incrementing or decrementing of the setting is desirable or whether, instead, it is best to retain the current setting. The numerical indicator 129, here "−7," which is simultaneously displayed with the preview items to indicate the setting corresponding to the current preview item, provides the user with yet another point of reference so that the user is kept informed on where a particular setting lies not only on a relative scale, as conveyed by the preview items themselves, but also on an absolute scale, that is, the user is given a sense of how much further adjustment can go to either extreme. The visual flagging of this indicator, here done by enlargement, can be specified by the demonstrational tool 32.

If the user decides that further incrementing or decrementing of the settings is desirable, the demonstrational tool 32 and interactive client 90 preferably cooperate together to provide an interactive scrolling tool so as to enable the user to scroll to additional preview items. In particular, the demonstrational tool preferably includes a regenerative component. Referring to FIG. 5, upon an attempt by the user to scroll beyond the increment-by-one or decrement-by-one preview item, 122c or 122a, the preview items are regenerated by this component so that in the attempted direction of scrolling, 130b or 130a, a preview item for the next increment or decrement, respectively, newly appears while in the opposite direction, 130a or 130b, the formerly appearing preview item, 122a or 122c, for the last decrement or increment, respectively, is dropped. In this fashion, the user can scroll to whichever preview items are desired while the total number of preview items displayed on-screen is at all times kept at a constant number so as to efficiently utilize limited screen space.

In the final step 132 of exemplary method 100 as depicted in FIG. 3, during adjustment of the settings of a particular control item, the user reviews or evaluates the preview items simultaneously presented on the display in order to determine which preview item, and hence which underlying setting, best optimizes the operational characteristic of concern. It is possible to separately provide a selection tool so that that the user can then actually make the selection; for example, in FIG. 5, a separate slider bar could be provided so that the user, after scrolling through the preview items 126 to find the best setting, can adjust the slider to actually select the brightness setting (e.g., −7) corresponding to the current setting preview item (e.g., item 122b). As step 132 also indicates, however, preferably the preview items are interactively operable not only for scrolling but also for selection. In the exemplary display of FIG. 5, for example, whereas a single button click and hold operation on the increment-by-one preview item 122c initiates scrolling, two button clicks in quick succession select the corresponding setting (i.e., −8). This approach simplifies the setting selection process. The enlarged label 134 ("Brightness") naming or identifying the control item concerned, as provided by the demonstrational tool 32, clearly advises the user which setting is currently subject to adjustment to ensure that changes are made only to the setting intended.

Figure 7:
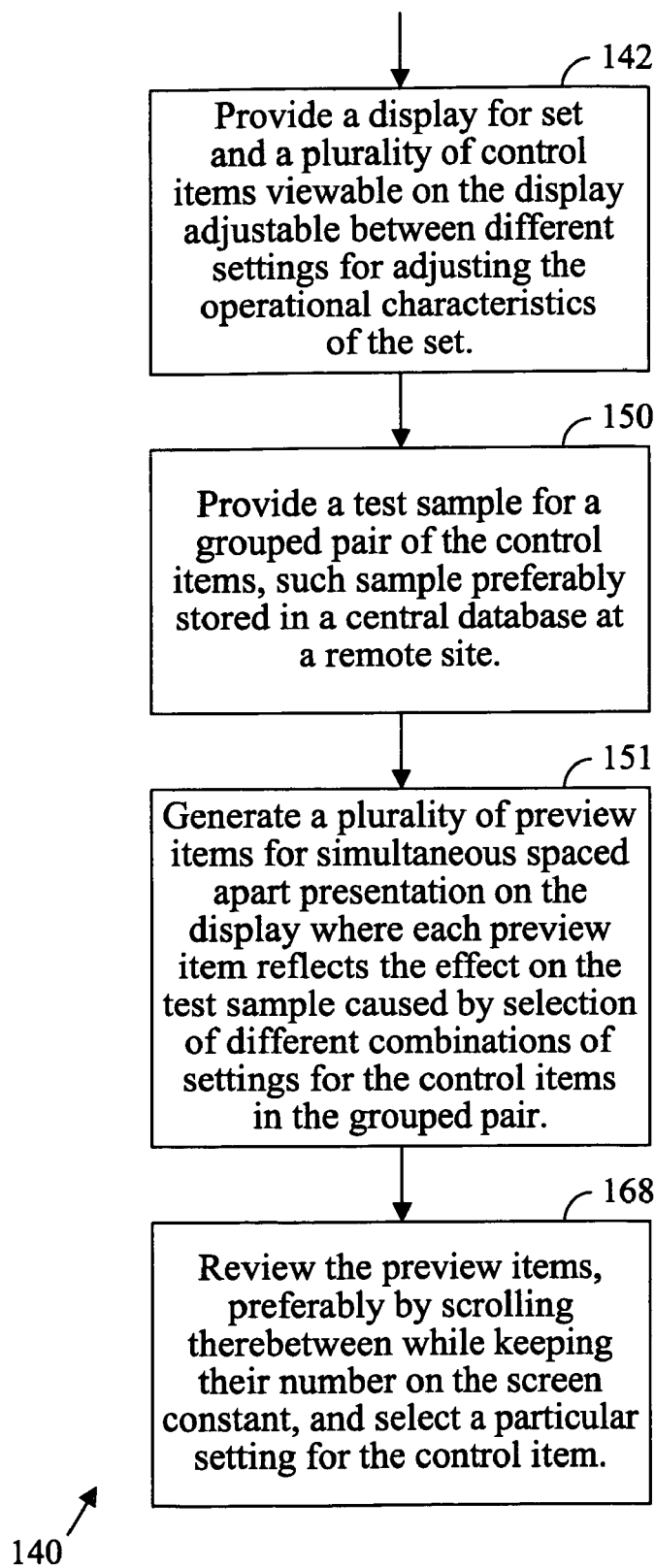
FIG. 7 is a flowchart outlining a second exemplary method for adjusting the operation of a media-playing set.
Figure 8:
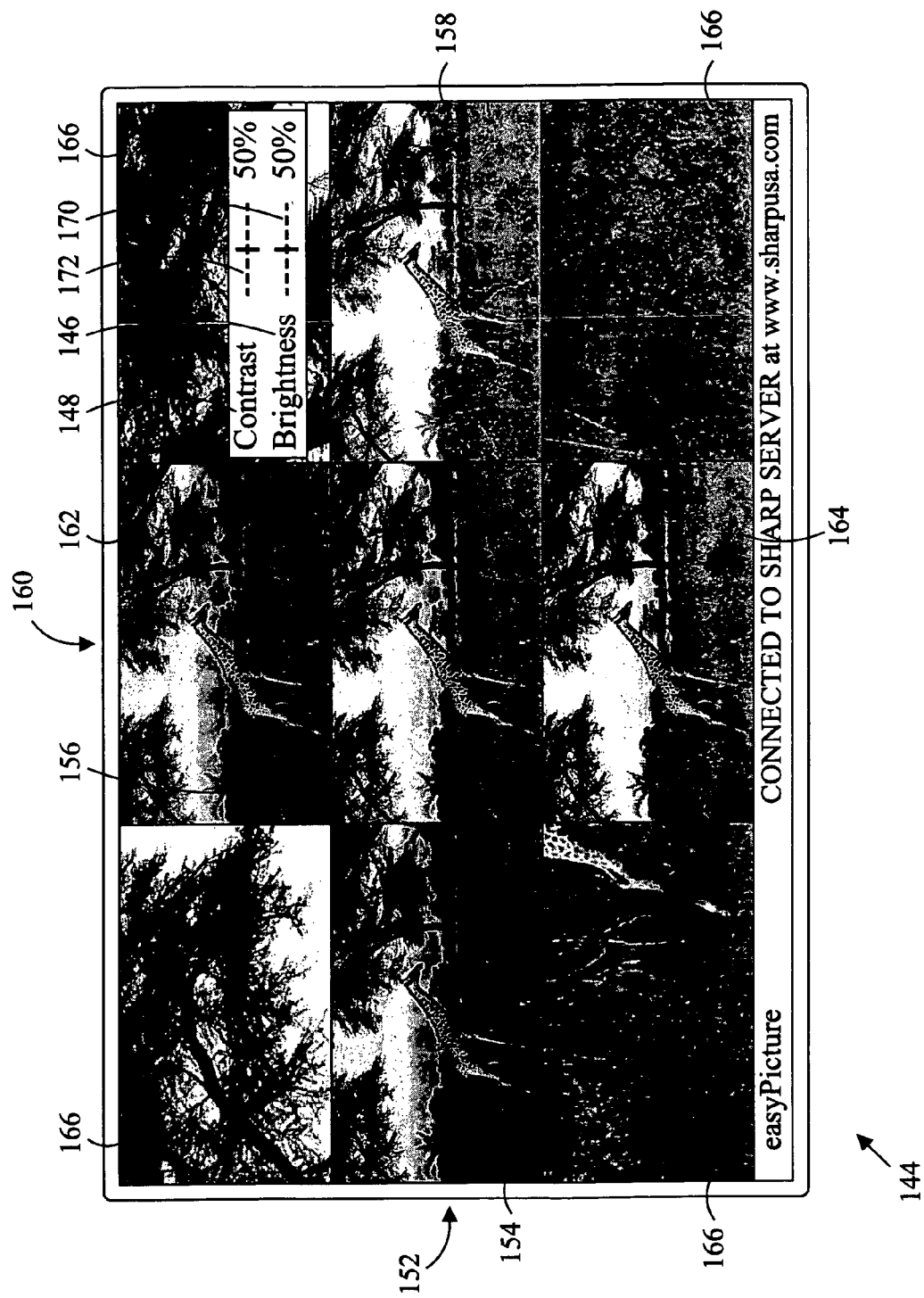
FIG. 8 is a plan view showing preview items as simultaneously presented on the display of a media-playing set in accordance with a second exemplary method and system of the present invention.

III. Expanded Interactive Preview of Effects of Different Operational Settings FIG. 7 outlines a second exemplary method 140 for adjusting a media-playing set. The first step 142 of this method involves providing a display for the set and a plurality of control items viewable on the display adjustable between different settings for adjusting the operational characteristics of the set. Such display can take the form of a conventional control menu as shown in FIG. 4 listing control items such as backlight, brightness, color, contrast, and so on. In this second method, in contrast to the first method 100 described above, the control items are adjusted by grouped pair, that is, for each control item adjustable under this method there is a related control item that is grouped with it. This is done because for certain control items, the best setting for one of the items can impair the best setting available for the other so it is preferable to evaluate such settings concurrently to determine the best setting for both control items considered together. Accordingly, under the present method and system, if the user navigates, for example, to the Brightness control item 106d and selects it for adjustment, an exemplary display 144 results as shown in FIG. 8 where both the brightness control item 146 and the contrast control item 148 are simultaneously presented for concurrent adjustment. Other control items preferably organized into grouped pairs include color and color temperature as well as source type (selectable under the Setup category) and backlight mode.

Step 150 of the second exemplary method 140 involves providing a test sample for a grouped pair of the control items where such sample is preferably stored in a central memory database at a remote site. Referring to the exemplary system 20 of FIG. 1, the test samples can be stored, for example, in the centralized storage database 72 provided at the remote support site 62. As discussed in greater detail above, the advantages of storing the test samples off-site, as opposed to locally at each set, include less memory being needed at the set and convenient upgradeability of the samples and set. More generally, the discussion above about the test samples made in connection with the first exemplary method 100 applies with equal force here except that a test sample is now provided for each grouped pair of control items instead of for each control item individually.

Step 151 involves generating a plurality of preview items for simultaneous presentation on the display during adjustment of the control item, such preview items being based on the test sample such that each preview item reflects the effect on the test sample caused by selection of different combinations of settings for the control items in the grouped pair. In the exemplary system 20 shown in FIGS. 1 and 2, the preview items are generated off-site by the demonstrational tool 32.

FIG. 8 shows such preview items as simultaneously presented on an exemplary display 144. In the exemplary display shown, the preview items are organized into a first set or series 152, including individual preview items 154, 156, and 158, and a second set or series 160, including individual preview items 162, 156, and 164. All the preview items are based on a common underlying test sample or image, here comprised of whitewashed buildings on an earth-toned background.

Preferably, as depicted in FIG. 8, the preview items in each set reflect the effect on the test sample caused by selection of different settings for one of the control items in the grouped pair with the settings for the other of the control items being held constant. Hence, the first set 152 reflects the effect on the test sample caused by different settings for the brightness control item 146 with the contrast control item 148 left unchanged, and the second set 160 reflects the effect caused by different settings for the contrast control item 148 with the brightness control item 146 left unchanged. In this manner, the user can see the effects that different adjustments will have down to the individual control level while still being able to see the effects of a particular adjustment on both control items simultaneously.

In the intuitive arrangement of preview items shown in FIG. 8, the first set 152 of preview items extends along a first or horizontal direction and the second set 160 extends along a second or vertical direction mutually perpendicular to the first. Corner areas 166 are unchanging or stationary background images. The center preview item 156 represents the effect on the test sample or image of the current combination of settings for the grouped pair of control items, for example, here indicated as a setting of 50% for the brightness control 146 and a setting of 50% for the contrast control 148.

Figure 9:
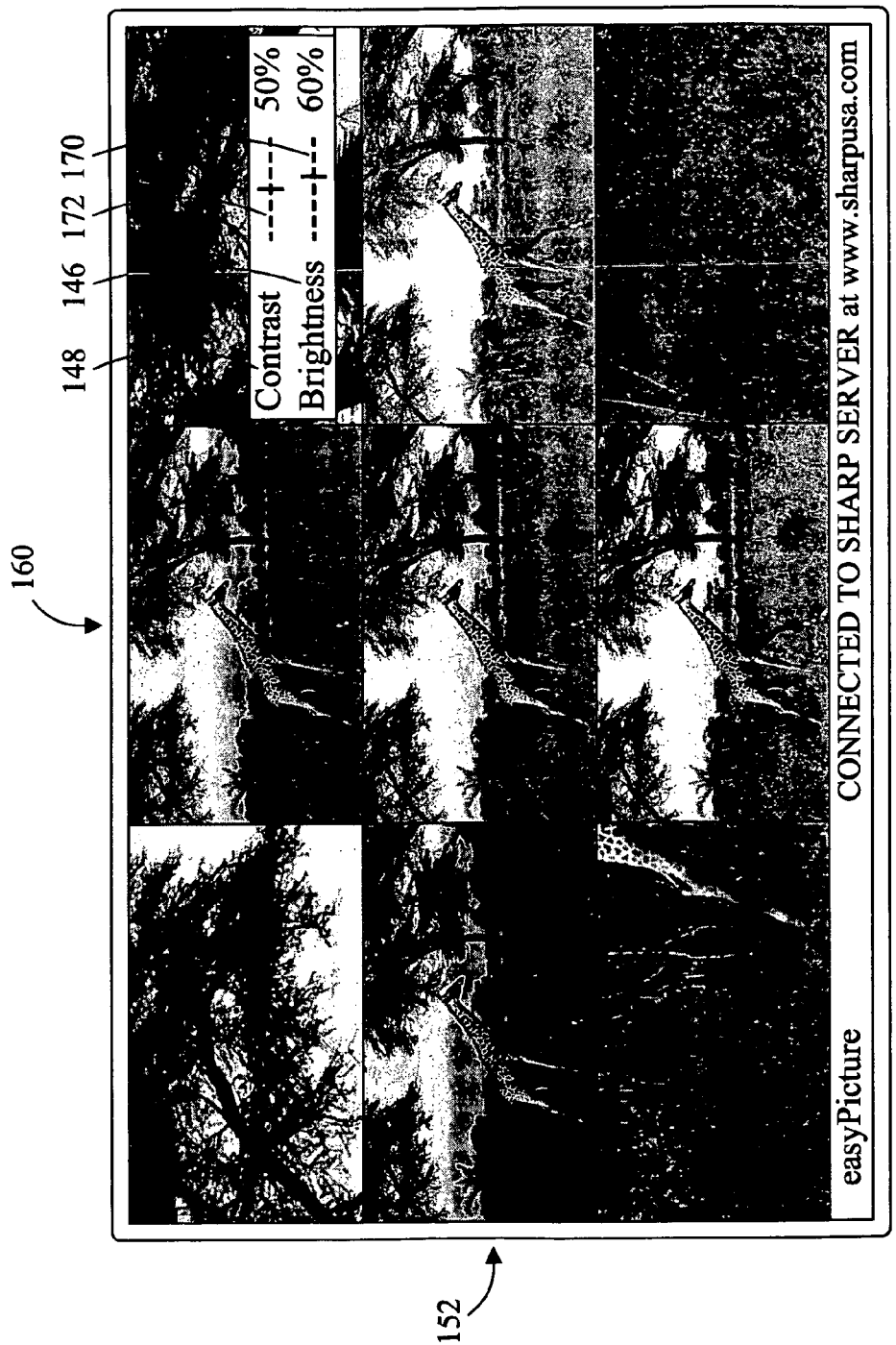
FIG. 9 is a plan view of the preview items simultaneously displayed on the set of FIG. 8 after adjustment of the brightness control item.
Figure 10:
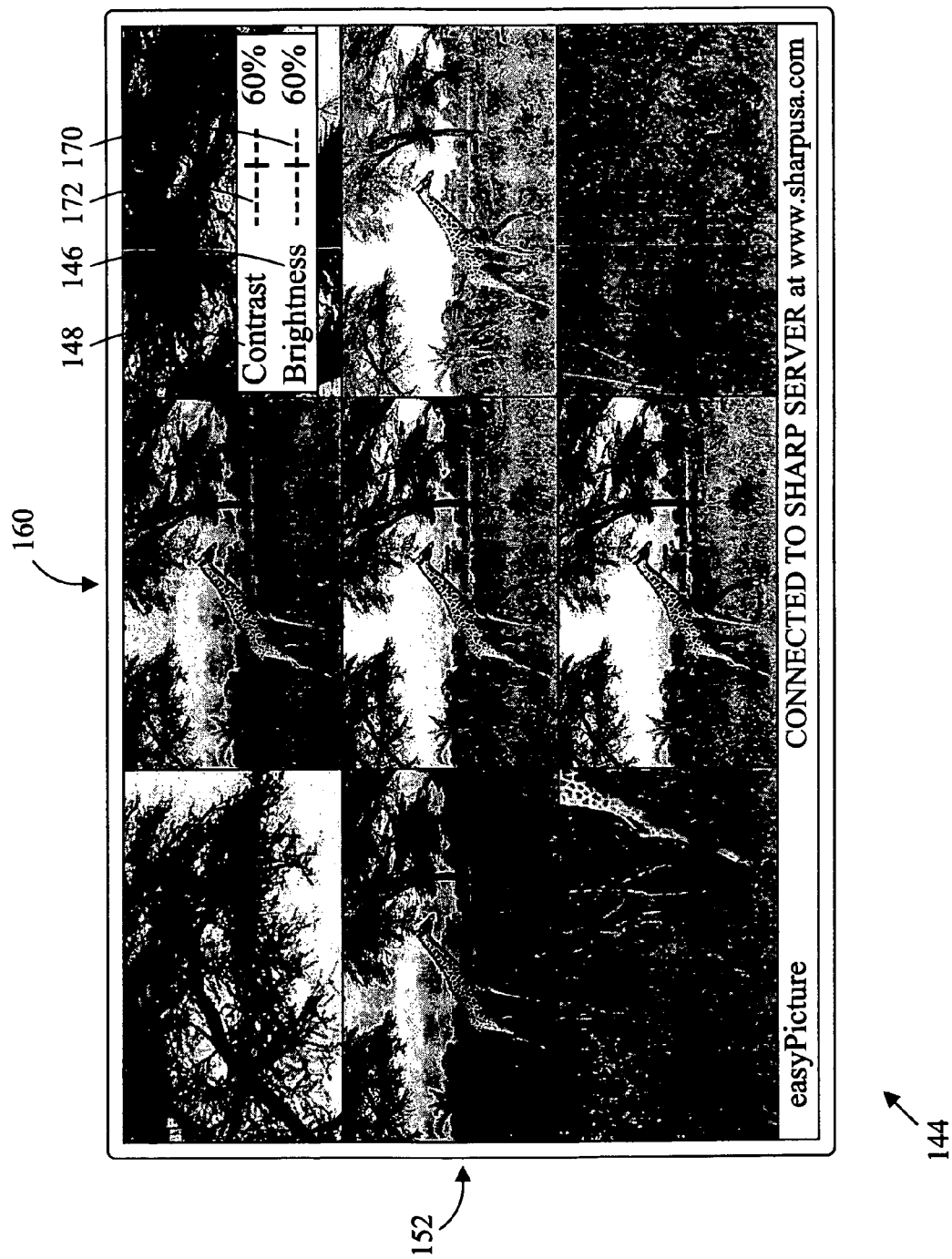
FIG. 10 is a plan view of the preview items simultaneously displayed on the set of FIG. 9 after adjustment of the contrast control item.

Referring to step 168, while adjusting one or both of the control items in the grouped pair, the user reviews or evaluates the preview items, preferably by scrolling, to see which possible combination of settings provides the optimal effect on the test image. For example, the user can scroll horizontally to a brightness setting of 60%, as shown in FIG. 9, and then scroll vertically to a contrast setting of 60% as shown in FIG. 10, to confirm the effect such settings would have. This scrolling operation can be initiated by clicking and holding on the outermost preview item (154, 158, 162, or 164 in FIG. 8) in the desired direction of scrolling or by shifting the slider bar 170 or 172 for the corresponding control item 146 or 148. In a manner similar to that described above in connection with the first exemplary method, the demonstrational tool 32 preferably includes a regenerative component for regenerating new preview images whenever a scrolling operation occurs. Hence the effect of the new settings will be apparent from the newly appearing preview items while the total number of preview images on the display is kept or remains constant so as to efficiently utilize limited screen space. Preferably, also, the preview items are interactive for selection as well as scrolling, that is, if the user wishes to select a setting corresponding to a particular preview item, he or she merely clicks on that preview item twice, for example, to make the selection.

A first and second method and system have now been described that enable comparative and interactive preview of the effects of different operational settings to facilitate adjustment of a media-playing set. It will be evident to those of ordinary skill in the art that at least certain substitutions and combinations other than those set forth in the above description of the invention are possible and could be employed to alter the particular structures and operations described without, in fact, significantly deviating from the core teachings and essential elements of the present invention. It will be particularly noted that the terms and expressions employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A system for adjusting the operation of a media-playing set, said system comprising:
   (a) a display and a control item viewable on said display, said control item being adjustable between different settings for adjusting the operational characteristics of said set;
   (b) memory at a support site remote from said display, where said memory stores a test sample for said control item; and
   (c) a demonstrational tool to generate a plurality of visual preview items for simultaneous presentation on said display during adjustment of said control item, said visual preview items being based on said test sample such that each visual preview item visually shows a selected effect on said test sample caused by selection of one of a plurality of mutually-exclusive available settings for said control item, where said plurality of visual preview items are each retrieved from said support site while showing their respectively selected effects.

2. The system of claim 1 wherein said memory is provided by a central database included at said support site located remotely from and connectible electronically to said set and other sets.

3. The system of claim 1 wherein said control item is accessible through a control menu providing more than one control item.

4. The system of claim 3 wherein said preview items for said control item are simultaneously presented in overlapped relationship with said control menu.

5. The system of claim 1 wherein said control item adjusts a picture characteristic of said set.

6. The system of claim 1 wherein said test sample is specified so as to generally increase the relative differences between said preview items based thereon.

7. The system of claim 1 wherein said preview items are selected from the group consisting of image, video, and audio items.

8. The system of claim 1 wherein said plurality of preview items are interactive such that a user can select a particular setting for said control item by selecting the corresponding preview item.

9. The system of claim 8 wherein said demonstrational tool further generates a label for simultaneous display with said preview items naming said control item subject to adjustment.

10. The system of claim 1 wherein said preview items generated include a current setting preview item, an increment-by-one preview item, and a decrement-by-one preview item reflecting the effect on said test sample caused by selection of the current setting, the current setting incremented by one, and the current setting decremented by one, respectively, for said control item.

11. The system of claim 10 further including a scrolling tool enabling a user of said set to scroll between said preview items, said demonstrational tool including a regenerative component so that upon an attempt to scroll beyond the increment-by-one or decrement-by-one preview item, then the preview items are regenerated so that in the direction of scrolling a preview item for the next increment or decrement newly appears while in the direction opposite scrolling the formerly appearing preview item for the last decrement or increment is dropped.

12. The system of claim 10 wherein said demonstrational tool further specifies an indicator for simultaneous display with said preview items that indicates on an absolute scale the setting adjustment corresponding to said current setting preview item.

13. A system for adjusting the operation of a media-playing set, said system comprising:
   (a) a display and control items viewable on said display, each control item being adjustable between different settings for adjusting a corresponding operational characteristic of said set;
   (b) memory at a support site remote from said display, where said memory stores a test sample for a grouped pair of said control items; and
   (c) a demonstrational tool to generate a plurality of visual preview items for simultaneous presentation on said display during adjustment of said control item, said visual preview items being based on said test sample such that each visual preview item visually shows a respectively different selected effect on said test sample caused by selection of one of a plurality of mutually exclusive combinations of settings for said control items in said grouped pair, where said plurality of visual preview items are retrieved from said support site while showing their respectively selected effects.

14. The system of claim 13 wherein said memory is provided by a central database included at a support site located remotely from and connectible electronically to said set and other sets.

15. The system of claim 13 wherein said preview items are further organized into a first and second set where said preview items in each set reflect the effect on said test sample caused by selection of different settings for one of said control items in said grouped pair with the settings for the other of said control items being held constant.

16. The system of claim 15 wherein said preview items are simultaneously presented on said display such that said first set of preview items extends along a first direction and said second set extends along a second direction mutually perpendicular to said first direction.

17. The system of claim 16 further comprising a third set of preview items extending along a third direction.

18. The system of claim 16 wherein said third direction is perpendicular to both said first and second directions.

19. The system of claim 13 wherein said grouped pair of control items adjust color and color temperature.

20. The system of claim 13 wherein said grouped pair of control items adjust brightness and contrast.

21. The system of claim 13 wherein said grouped pair of control items adjust source type and backlight mode.

22. The system of claim 13 wherein said grouped pair of control items adjusts two different items.

23. A method for adjusting the operation of a media-playing set, said method comprising:
   (a) providing a display and a control item viewable on said display, said control item being adjustable between different settings for adjusting the operational characteristics of said set;
   (b) providing a test sample for said control item; and
   (c) while adjusting the respective settings of said control item, reviewing a plurality of visual preview items simultaneously presented on said display, said visual preview items being based on said test sample such that each visual preview item visually shows a selected effect on said test sample caused by selection of a respective one of a plurality of mutually-exclusive settings for said control item, where said plurality of visual preview items are each retrieved from a database stored at a location remote from said media playing set, while respectively reflective of a selected one of said effects, and displayed for review through a network connection to said media playing set.

24. The method of claim 23 further including accessing said control item through a control menu providing more than one control item.

25. The method of claim 23 further including keeping said control menu on said display while reviewing said preview items.

26. The method of claim 23 further including adjusting said control item to adjust a picture characteristic of said set.

27. The method of claim 23 further including perceiving said preview items simultaneously presented on said display both collectively and individually in terms of differences therebetween.

28. The method of claim 23 further including selecting a particular setting for said control item by selecting the corresponding preview item.

29. A method for adjusting the operation of a media-playing set, said method comprising:
(a) providing a display and control items viewable on said display, each control item being adjustable between different settings for adjusting a corresponding operational characteristic of said set;
(b) providing a test sample for a grouped pair of said control items; and
(c) while adjusting at least one of said control items of said grouped pair, reviewing a plurality of visual preview items simultaneously presented on said display, said visual preview items being based on said test sample such that each visual preview item visually shows a respectively different selected effect on said test sample caused by selection of one of a plurality of mutually exclusive combinations of settings for said control items in said grouped pair, where said plurality of visual preview items are retrieved from a support site remote from said media playing set while showing their respectively selected effects.

30. The method of claim 29 further including providing a support site having a central database for storing said test sample and electronically connecting said set to said support site in order to generate said preview items.

31. The method of claim 29 further including scrolling between said preview items while the number of said preview items simultaneously presented on said display remains constant.

32. The method of claim 29 further including scrolling between said preview items in both of two mutually perpendicular directions.

* * * * *